United States Patent
Lilie

(10) Patent No.: US 6,828,711 B2
(45) Date of Patent: Dec. 7, 2004

(54) LAMINATION AND LAMINATION ARRANGEMENT FOR A LINEAR MOTOR

(75) Inventor: Dietmar Erich Bernhard Lilie, Joinville (BR)

(73) Assignee: Empresa Brasileira de Compressores S.A. -Embraco, Joinville (BR)

( * ) Notice: Subject to any disclaimer, the term of this patent is extended or adjusted under 35 U.S.C. 154(b) by 0 days.

(21) Appl. No.: 10/478,982
(22) PCT Filed: May 21, 2002
(86) PCT No.: PCT/BR02/00073
§ 371 (c)(1), (2), (4) Date: Jan. 13, 2004
(87) PCT Pub. No.: WO02/095906
PCT Pub. Date: Nov. 28, 2002

(65) Prior Publication Data
US 2004/0113509 A1 Jun. 17, 2004

(30) Foreign Application Priority Data
May 22, 2001 (BR) .............................. 0102842

(51) Int. Cl.⁷ ................................................ H02K 1/12
(52) U.S. Cl. ........................ 310/254; 310/217; 310/12
(58) Field of Search ................................ 310/216–218, 310/12–15, 23, 25, 27, 30, 34, 254, 258, 259

(56) References Cited

U.S. PATENT DOCUMENTS

| | | | |
|---|---|---|---|
| 3,591,819 A | | 7/1971 | Laing et al. ................. 310/180 |
| 3,828,211 A | | 8/1974 | Laronze ....................... 310/13 |
| 4,206,373 A | * | 6/1980 | Hurst .......................... 310/13 |
| 4,827,163 A | * | 5/1989 | Bhate et al. ................... 310/5 |
| 5,315,190 A | * | 5/1994 | Nasar .......................... 310/12 |
| 5,945,748 A | | 8/1999 | Park et al. ..................... 310/12 |
| 6,060,810 A | * | 5/2000 | Lee et al. ..................... 310/254 |
| 6,169,350 B1 | * | 1/2001 | Yang .......................... 310/216 |
| 6,573,624 B2 | * | 6/2003 | Park ........................... 310/12 |

FOREIGN PATENT DOCUMENTS

| EP | 0 652 622 A2 | 5/1995 |
|---|---|---|
| WO | WO-93/14551 A1 | 7/1993 |

OTHER PUBLICATIONS

Patent abstracts of Japan, vol. 1999, No. 3, Mar. 31, 1999 & JP 10 322945 A (Mitsubishi Electric Corp.), Dec. 4, 1998.

* cited by examiner

Primary Examiner—Dang Le
(74) Attorney, Agent, or Firm—Darby & Darby

(57) ABSTRACT

A lamination and a lamination arrangement for a linear motor, in which the lamination (30) has a base (31) to be disposed adjacent to a fixed member, and at least one wing (33), whose end is bent at an angle in relation to the plane of the base (31) and the wing (33) to form a flap (38). A plurality of laminations is arranged in a circular array, with the ends of the flaps (38) defining the angular spacing between the front edges of the laminations (30). The flaps (38) are generally coplanar to each other in the array and form a surface having a relatively large area, in order to allow an external member to be affixed to said flaps (38) for mounting the array of laminations (30).

14 Claims, 5 Drawing Sheets

LAMINATION AND LAMINATION ARRANGEMENT FOR A LINEAR MOTOR

This application is a U.S. national phase application under 35 U.S.C. § 371 of International Patent Application No. PCT/BR02/00073 filed May 21, 2002, and claims the benefit of Brazilian Patent Application No. PI0102842-1 filed May 22, 2001 which is incorporated by reference herein.

FIELD OF THE INVENTION

The present invention relates to a lamination for a linear motor and to an arrangement that provides a more secure mounting of said laminations.

BACKGROUND OF THE INVENTION

Linear motors are well known devices, in which one of a coil or magnet element is mounted to a fixed member, and the other element is mounted to a member to be moved. The linear motor has an array of inner laminations and an array of outer laminations, between which the magnet element is moved. Electric current is applied to the coil, which generates magnetic lines of force to interact with the magnet element to produce linear motion of the movable member. Such linear motors are generally used in refrigeration compressors in which the movable member is defined by the piston of the compressor and the magnet element is mounted to said piston. The coil is fixedly mounted to an external portion of the compressor structure that forms the cylinder, inside which the piston is reciprocated upon operation of the linear motor. Linear motors are used in other devices in order to, for example, reciprocate a shaft inside a bushing, with the movement of the shaft performing work in a machine.

FIG. 1 of the appended drawings illustrates an inner lamination 30 of a known construction for a linear motor. This inner lamination 30 is planar and usually stamped from a piece of sheet metal material having magnetic characteristics. The inner lamination 30 has a generally "U" shaped base 31 incorporating a pair of coplanar wings 33 having a pointed end that may be defined as a flat tip 34, as illustrated. Each inner lamination 30 has a recess or a cut-out 36, into which is mounted a toroidal coil (not shown), to which electric current is applied. FIGS. 2 and 3 illustrate the mounting of inner laminations 30 in a circular array to form the stator of a linear motor, and the bases 31 of the inner laminations 30 are secured around a first fixed member, which may be defined by a bushing, in which a shaft is reciprocated, or by the cylinder of a compressor, within which a piston is reciprocated. An array of outer laminations 20 is placed around a second fixed member, which may be defined by the inner face of a cup that houses the bushing or the compressor cylinder.

In the embodiment of the inner laminations 30 illustrated in FIGS. 1 and 2, the flat tip 34 of the upper wing 33 defines the available area for welding or gluing the array of laminations to a mounting member such as a cylinder flange or an annular connecting element, as described ahead. This substantially limited surface area, defined by the thickness of the lamination itself, may not be adequate to assure good fixation and mounting of the array of inner laminations 30.

One way to form the array of inner laminations 30 in a linear compressor is shown in FIG. 4. In this construction, a cylinder 10 of the compressor has a center bore in which the piston (not shown) is reciprocated. Around the outer periphery of part of the cylinder 10 are mounted the bases 31 of an array of inner laminations 30, which are secured to the external periphery of the cylinder 10 or any other suitable support means mounted to the cylinder. The laminations of the array of outer laminations 20 are in the form of individual pieces mounted around the interior of a circular wall of a cup (not shown). The upper ends of the outer laminations 20 are also in the form of a flat tip affixed to the lower face of a flange 10a incorporated to and extended radially from the cylinder 10, and said fixation to the lower face of the flange 10a is achieved by an adhesive or by welding. Alternatively, the outer laminations 20 can be mounted to a support provided on the wall of the cup, within which the cylinder is positioned.

FIG. 5 shows another type of lamination mounting arrangement for the motor of a linear compressor, such as described in the co-pending patent application of the same applicant. In the mounting illustrated in FIG. 5, the cylinder 10 of the compressor does not have the flange boa, which makes the manufacture of the cylinder relatively complex and expensive. In this embodiment of FIG. 5, the inner laminations 30 have their wings 33 provided with flat tips 34. The ends of the outer laminations 20 are also flat in this embodiment, in which a connecting ring 40, of a nonmagnetic material, is mounted to the upper ends of the inner laminations 30 and the outer laminations 20, and affixed to said ends by adhesive or by welding. Thus, there is provided a suspension mounting of the outer laminations 20 through the connecting ring 40 that is attached to the inner laminations 30, these in turn being attached to the cylinder 10.

The area, by which either the lower face of the flange 10a of the cylinder 10 of the structure illustrated in FIG. 4 or the lower face of the connecting ring 40 of the construction illustrated in FIG. 5 can be attached to the upper end of the inner laminations 30 and the outer laminations 20, is only that defined by the thickness of each lamination. Where the laminations are thin, the mounting is not very stable. In the case of the outer laminations 20, the end fixation area of each lamination is not critical due to the relatively small radial width of the outer laminations 20, which allows maintaining them very close to each other throughout the radial width thereof. In this case, the end fixation areas are practically associated to each other, facilitating the fixation thereof by glue or welding.

Nevertheless, in the case of the inner laminations 30, the radial width thereof makes them divergent relative to each other, from the inner edge affixed to the cylinder 10 towards the outer edge 35. The outer edges 35 are quite separated from each other, and so are the flat tips 34 of the upper ends, avoiding the fixation of all said flat tips 34 as a single surface. Thus, for the inner laminations 30, the upper fixation area is critical to provide for better fixation of said laminations.

Another problem of the constructions described above is the difficulty of maintaining the inner laminations 30 spaced apart from each other by a certain angle around the entire external periphery of the compressor cylinder.

Accordingly, it would be desirable to provide a lamination having a structure that can be arranged in a circular array, such as that defined by the inner laminations 30 and the outer laminations 20 of a linear motor, in order to provide a larger surface area for fixation of at least one of the ends thereof to another member.

OBJECTS OF THE INVENTION

It is an object of the present invention to provide an improved structure for a lamination, which is to be arranged in a array of laminations, such as used in a linear motor, in order to provide a larger surface area for fixation of at least one end of each lamination of the array to an external member.

SUMMARY OF THE INVENTION

In accordance with the invention, a lamination for a linear motor is formed of a piece of metal having magnetic properties and presenting a structure comprising a base to be placed adjacent to a fixed member, such as the outer surface of a bushing or the cylinder of a linear compressor, or against the inner surface of another fixed member, such as a cup to house the bushing or the cylinder. The lamination incorporates at least one coplanar wing extending from the base and having an end that is bent at an angle in relation to the common plane of the base and the wing, to form a flap with a surface area corresponding to the size of the flap. A plurality of laminations is arranged in a circular array to form the linear motor. The flaps are provided at the upper end of the laminations of the array, in order to lie in a common plane to form a relatively large surface area for mounting of al external member to said array of laminations.

BRIEF DESCRIPTION OF THE DRAWINGS

This and other objects and advantages of the present invention will become more apparent upon reference to the appended drawings, in which.

DETAILED DESCRIPTION OF THE INVENTION

Figure 1:
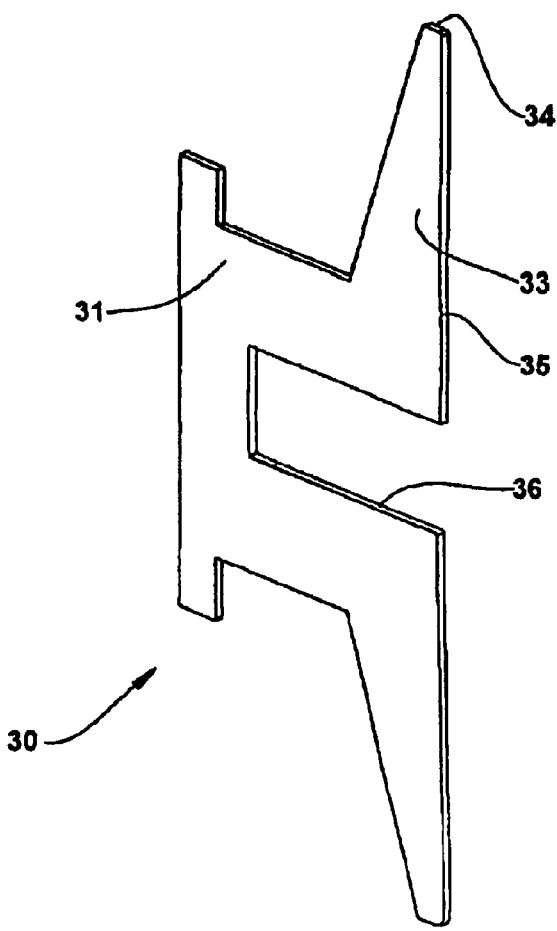
FIG. 1 is a perspective view of an inner lamination of the prior art.
Figure 2:
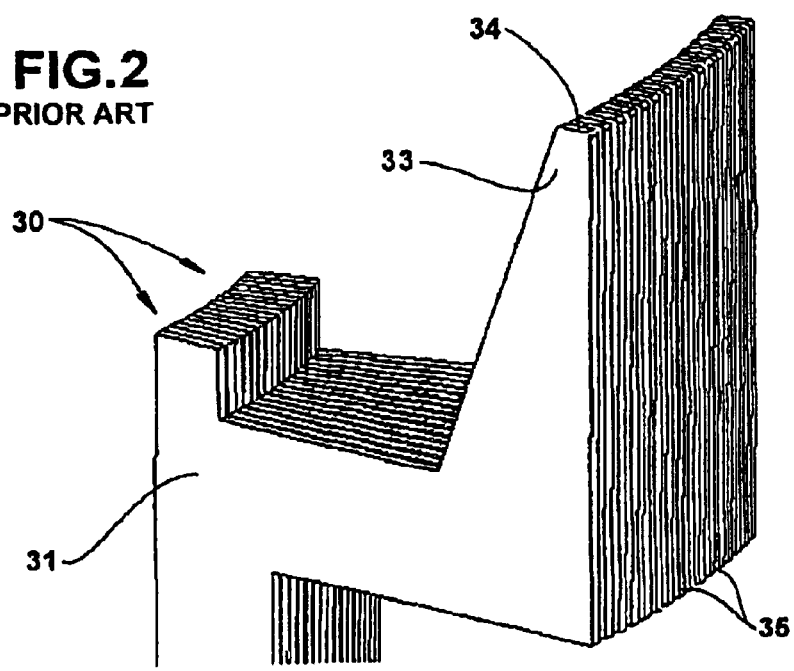
FIG. 2 is a partially cut elevational perspective view of an array of the laminations of FIG. 1.
Figure 3:
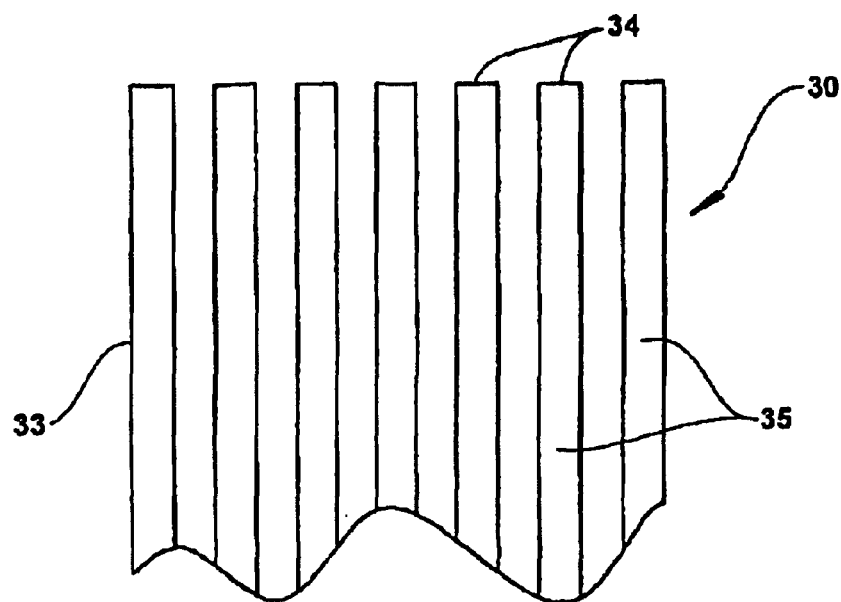
FIG. 3 is a top view of the array of laminations of FIG. 2.
Figure 6:
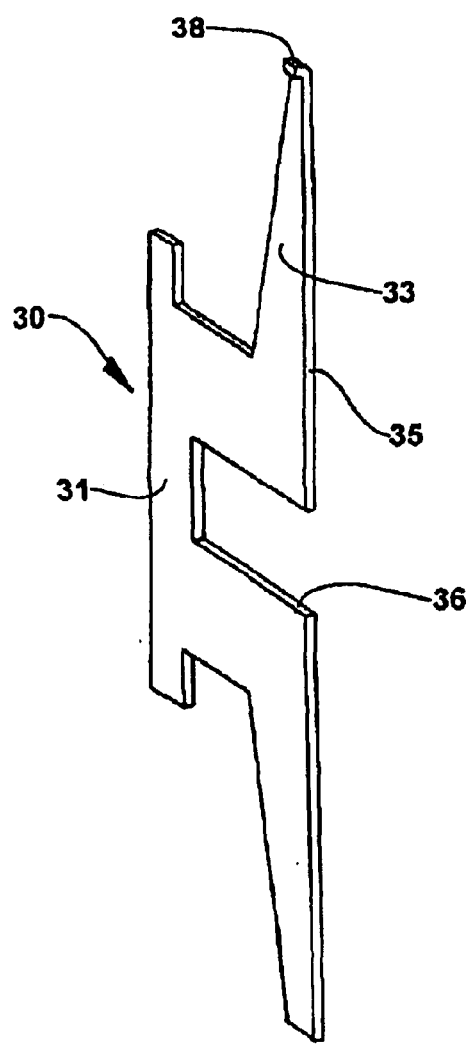
FIG. 6 is a perspective view of a lamination made according to the present invention.

FIG. 6 illustrates a perspective view of a lamination 30 for a linear motor, made in accordance with the present invention. As already described in relation to the prior art laminations, the inner lamination 30 of the present invention also comprises a planar piece of metal having magnetic properties and presenting a base 31 that forms a recess for housing a coil 60 and incorporating a pair of coplanar wings 33 having a front edge 35. The inner lamination 30 differs from those of FIGS. 1–5 in that the tip of the wing 33 is bent in relation to the plane of the lamination to form a flap 38.

In the embodiment illustrated in FIGS. 6, 7, 8 and 9, the angle of curvature α of the wings 38 is about 90°, so that each flap 38 lies transverse to the plane of the wing 33, providing a larger surface area. In this embodiment, the projection "p" of the flaps 38 in relation to the adjacent face of the lamination 30 is equal to or slightly smaller than the gap "g" existing between the front edges 35 of two adjacent laminations 30.

Figure 10:
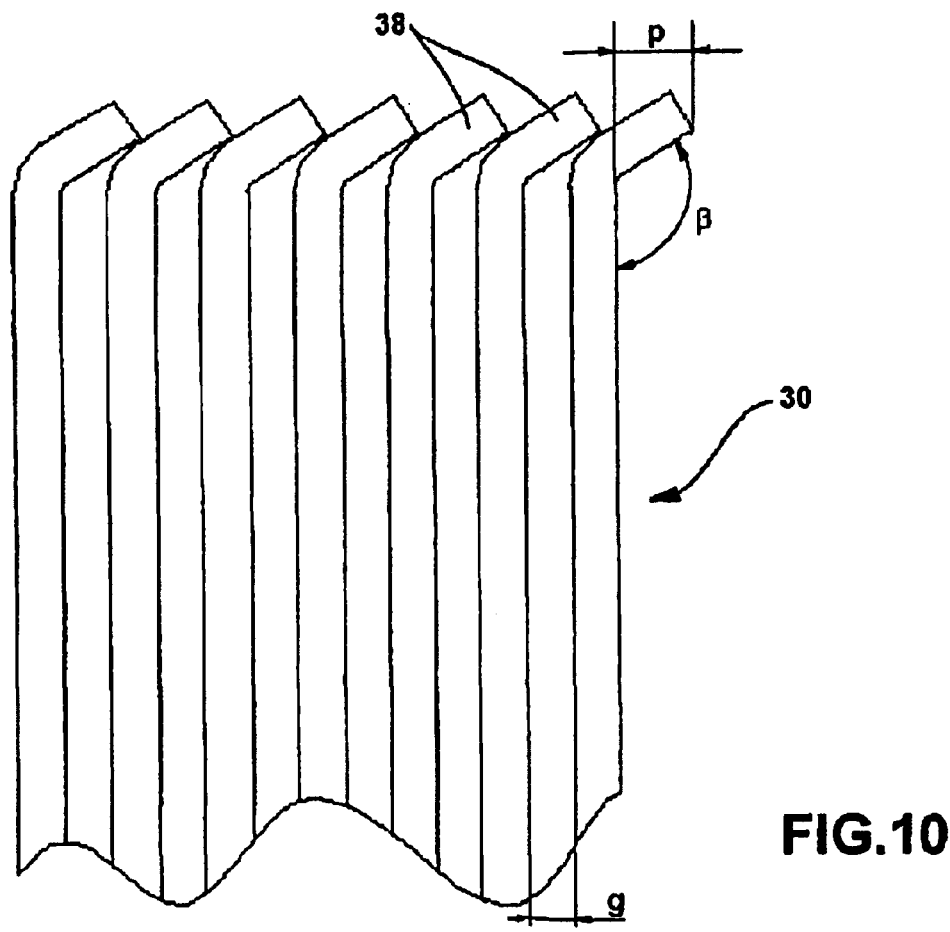
FIG. 10 is a similar view to that of FIG. 9, but illustrating another embodiment for the bend of the end flaps.

In the embodiment illustrated in FIG. 10, the angle of curvature β of the flaps 38 is superior 90° and inferior 180°, generally between about 90° and 150°, and its preferred value is defined by the equation $\beta=90+\arcsin[(e/e+g)]$, where "e" is the thickness of the lamination 30 and "g" is the gap between the front edges 35 of two adjacent laminations 30. In this embodiment, the projection "p" of the flaps 38 in relation to the adjacent face of the lamination 30 is equal or slightly larger than said gap "g", allowing the flaps 38 to be arranged partially overlapped when the projection "p" is larger than the gap "g".

Figure 7:
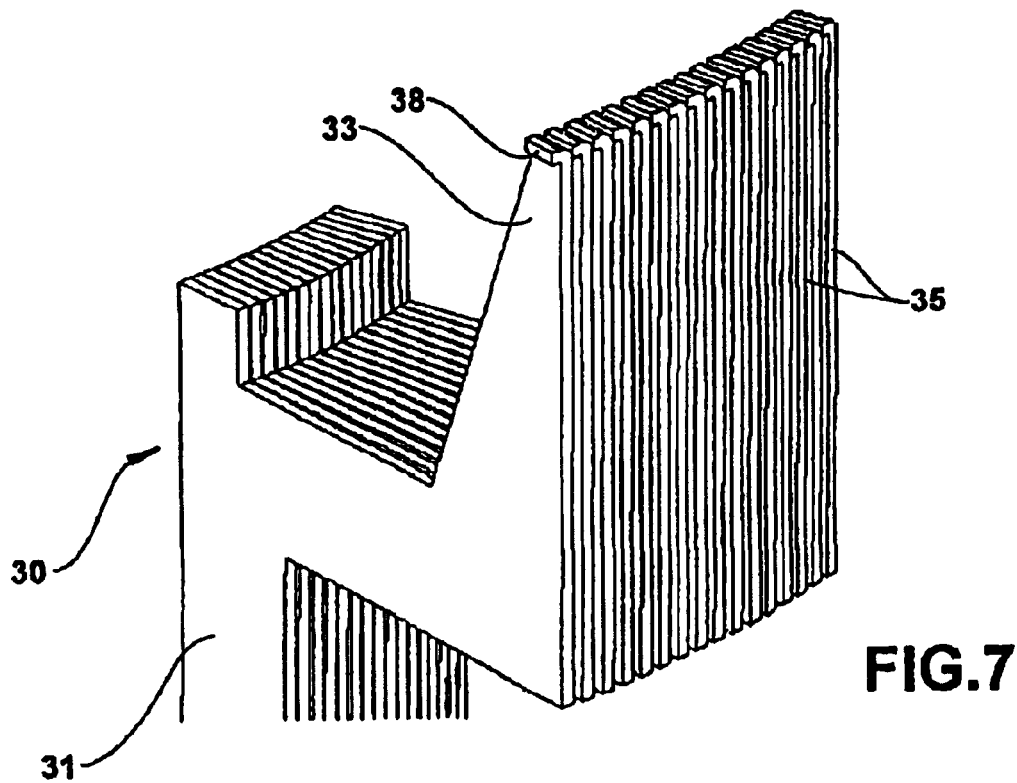
FIG. 7 is a partially cut perspective view of an arrangement formed by a plurality of the laminations illustrated in FIG. 6.
Figure 8:
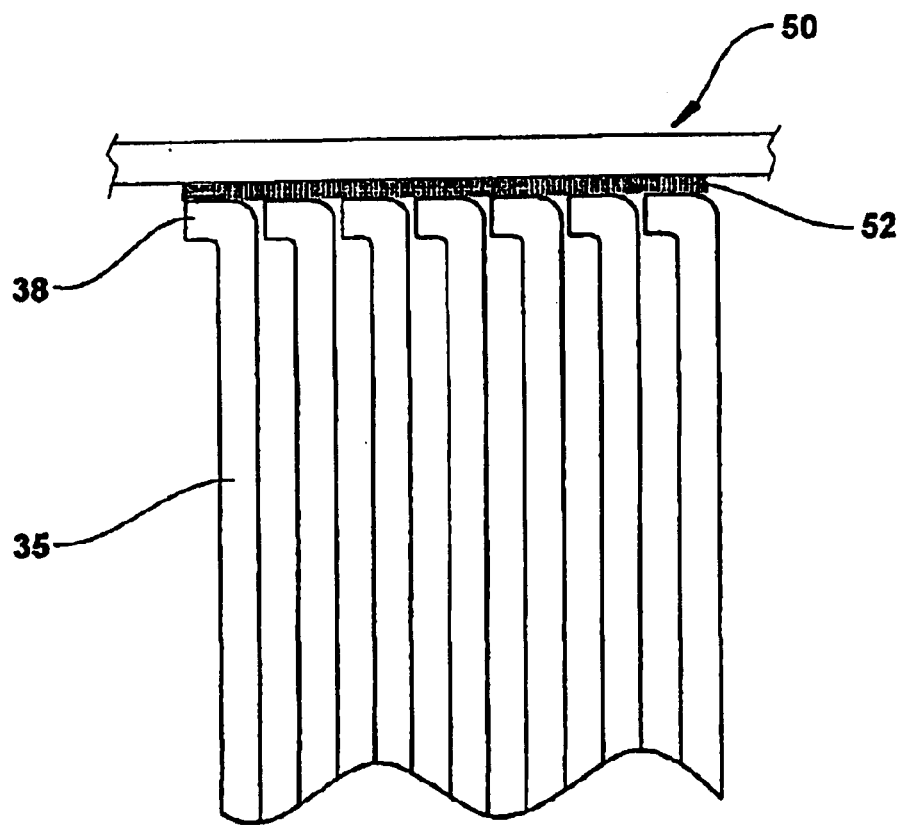
FIG. 8 is an elevational view of a portion of the array of laminations illustrated in FIG. 7.
Figure 9:
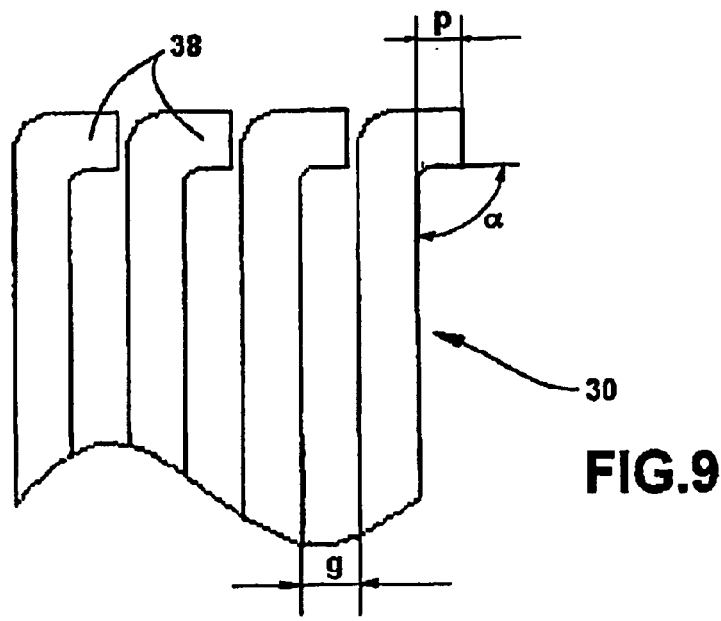
FIG. 9 is an elevational view of a portion of the array of laminations having the end flap bent according to one embodiment of the present invention.

With the illustrated construction, the flaps 38, which can be transversal or inclined in relation to the plane of the respective laminations 30, determine the spacing between the laminations 30 around the periphery thereof when they are disposed in an arrangement to define the electric motor, with each flap 38 contacting the adjacent lamination, facilitating to maintain a homogeneous angular spacing between the front edges 35 of the inner laminations 30. FIGS. 7 and 8 show a plurality of inner laminations 30 arranged in a circular array, so as to form the inner laminations of a linear motor. As observed, the flaps 38 of the inner laminations 30 are aligned to each other and lie in a common plane, i.e., the flaps 38 are mutually coplanar.

Figure 4:
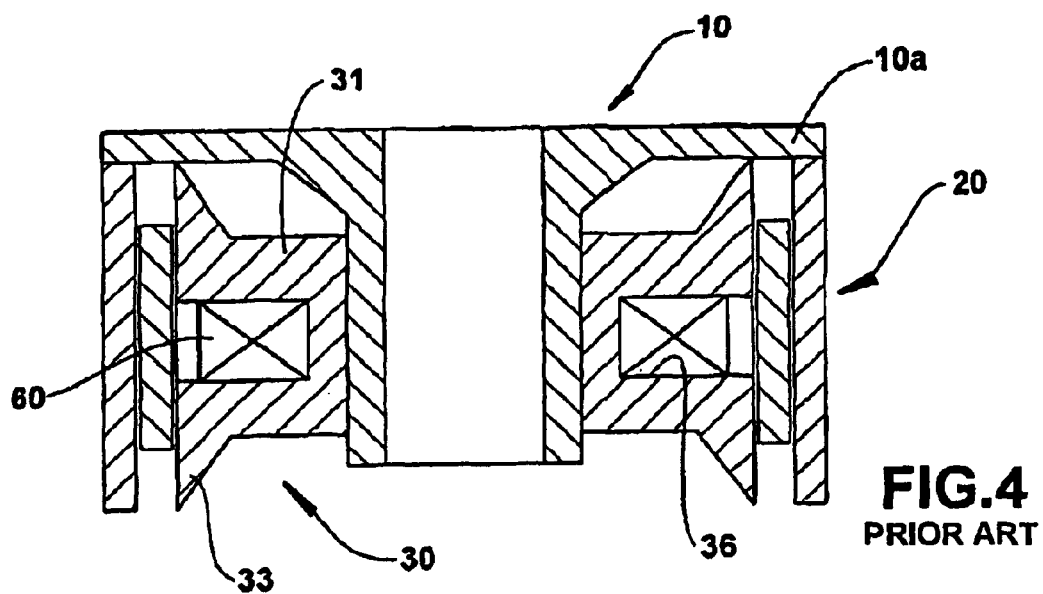
FIG. 4 is an elevational cross-sectional view of a portion of a prior art compressor, showing mounting of a linear motor containing inner and outer laminations.
Figure 5:
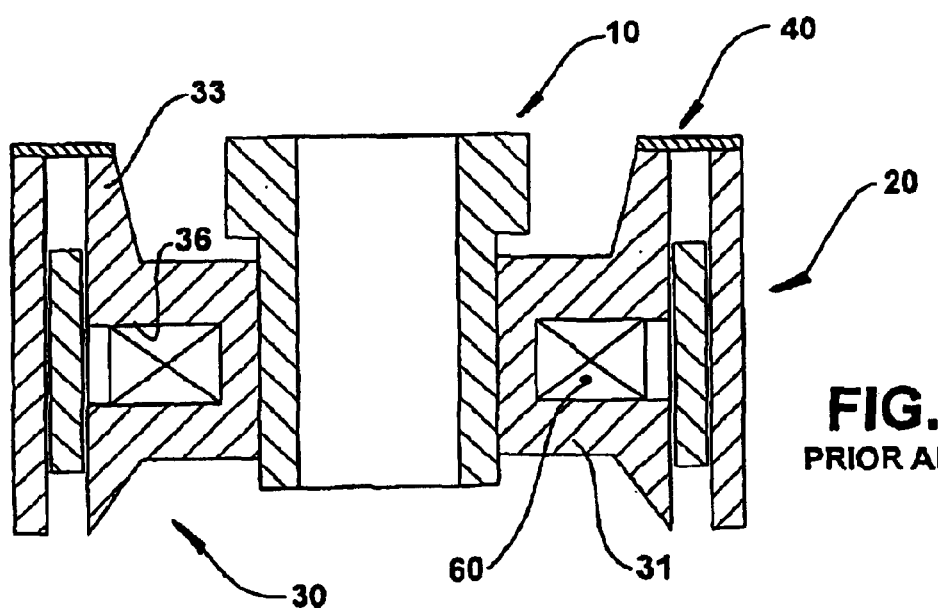
FIG. 5 is an elevational cross-sectional view of a portion of a prior art linear compressor, showing another type of mounting for the inner and outer laminations of the linear motor.

After being mounted in a circular array as shown in FIGS. 7 and 8, the flaps 38 present a generally planar contact area for an external member, such as the flange 10a of the cylinder 10 of FIG. 4, or the connecting ring 40 of FIG. 5. Said external member for the fixation of the tip 34 of the inner laminations 30 is represented by the piece 50 illustrated in FIG. 8, in which it is shown connected to the flaps 38 by an adhesive 52. The contact area formed by the flaps 38 is at least 50% greater than the contact area that is obtained only by the planar tips 34 of the inner laminations 30 illustrated in FIGS. 4 and 5, when the available surface area for the fixation is defined only by the thickness of the laminations. The provision of the flaps 38 provides for better welding or gluing conditions to the external member 50, which may be defined by the lower surface of the flange 10a of the cylinder 10 or the connecting ring 40. The flaps 38 also provide means that give the inner laminations 30 a more constant angular spacing, since the flaps 38 define a spacing jig.

The advantages of the novel lamination structure of the invention include:

increase of the gluing/welding area.

better structural reliability.

increased structural stiffness.

better reliability for the final product.

less noise.

better angular positioning of the laminations.

As described herein, the laminations can be used in a linear motor that can drive any type of device in which a movable member is reciprocated by the action of the motor.

While the flaps 38 are particularly adequate and necessary for mounting the inner laminations 30 of a linear motor, it should be understood that the same solution can be applied to the outer laminations 20, when the spacing therebetween suggests the use of the flaps 38 proposed herein.

Specific features of the invention are shown in the figures of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope defined by the appended claims.

What is claimed is:

1. A lamination for a linear motor that is made of a magnetic metal material and has a base (31) to be disposed adjacent to a fixed member (10) and incorporating at least one wing (33) extending from the base (31) in a coplanar mode in relation to said base (31), characterized in that the wing (33) has a tip that is bent at an angle to the plane of the base (31) and the wing (33) to form a flap (38) with an angle of about 90° to 150° in relation to the adjacent face of the lamination 30.

2. A lamination arrangement for a linear motor using the laminations as set forth in claim 1, characterized in that a plurality of laminations is arranged in an array, with each flap (38) presenting a projection (p) in relation to the adjacent face of the lamination (30) that is equal to or slightly smaller than the gap (g) existing between two adjacent laminations (30) in the region in which the flap (38) is provided, said flap (38) forming an angle of curvature ($\alpha$) of about 90° in relation to the adjacent face of the lamination 30.

3. The lamination arrangement for a linear motor as set forth in claim 2, characterized in that the flaps (38) are disposed in a mutual coplanar manner.

4. The lamination arrangement for a linear motor as set forth in claim 2, characterized in that the array of laminations is circular.

5. The lamination arrangement for a linear motor as set forth in claim 2, characterized in that it comprises an external member (50) affixed to the flaps (38) of the array of laminations.

6. The lamination arrangement for a linear motor as set forth in claim 5, characterized in that the external member (50) is affixed to the flaps (38) of the array of laminations by an adhesive (52).

7. The lamination arrangement for a linear-motor as set forth in claim 5, characterized in that the external member (50) is defined by a flange (10a) that is incorporated external to the cylinder (10) of a linear compressor around which the laminations are attached.

8. The lamination arrangement for a linear motor as set forth in claim 5, characterized in that the external member (50) is defined by a connecting ring (40) that is simultaneously affixed to the cylinder (10) of a linear compressor and to an array of outer laminations (20) of the linear motor of said compressor.

9. The lamination arrangement for a linear motor as set forth in claim 1, characterized in that a plurality of laminations is arranged in an array, each flap (38) having a projection (p) in relation to the adjacent face of the lamination (30) that is equal to or slightly larger than the gap (g) existing between two adjacent laminations (30) in the region in which the flap (38) is provided, said flap (38) forming an angle ($\beta$) superior to 90° and inferior to 180°.

10. The lamination arrangement for a linear motor as set forth in claim 9, characterized in that the angle of curvature ($\beta$) is preferably defined by the equation $\beta=90+\arcsin[(e/(e+g)]$, where "e" is the thickness of the lamination (30) and "g" is the gap existing between two adjacent laminations (30) in the region where the flap (38) is provided.

11. The lamination arrangement for a linear motor as set forth in claim 9, characterized in that the flaps (38) are arranged partially overlapped when the projection "e" is larger than the gap "g".

12. The lamination arrangement for a linear motor as set forth in claim 9, characterized in that the flaps (38) are disposed in a mutual coplanar manner.

13. The lamination arrangement for a linear motor as set forth in claim 9, characterized in that the array of laminations is circular.

14. The lamination arrangement for a linear motor as set forth in claim 9, characterized in that it comprises an external member (50) affixed to the flaps (38) of the array of laminations.

* * * * *